United States Patent Office 2,947,294
Patented Aug. 2, 1960

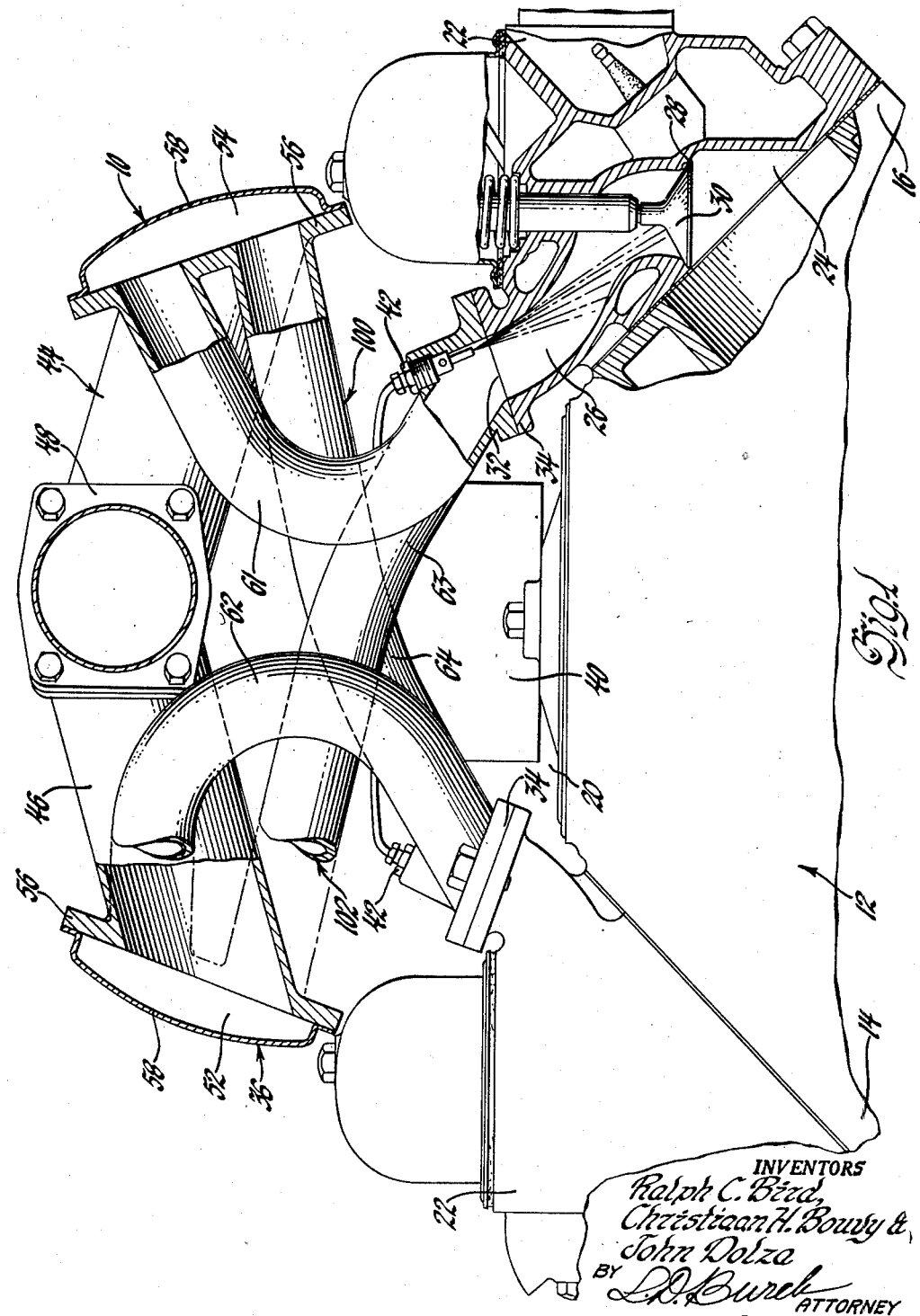

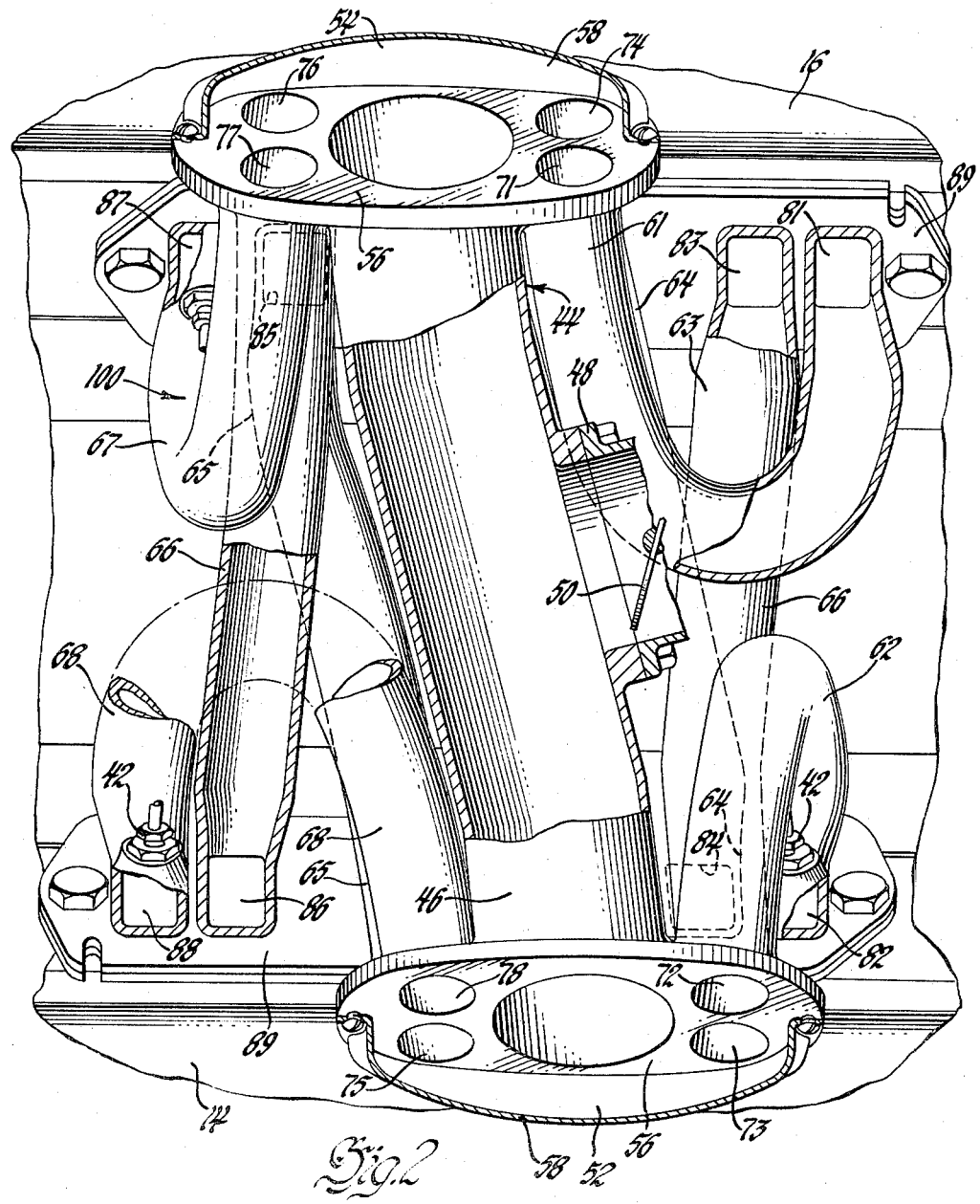

2,947,294
INDUCTION SYSTEM

Ralph C. Bird, Lansing, Christiaan H. Bouvy, Bloomfield Hills, and John Dolza, Fenton, Mich., assignors to General Motors Corporation, Detroit, Mich., a corporation of Delaware Filed June 10, 1957, Ser. No. 664,728

2 Claims. (Cl. 123—55)

The present invention relates to internal combustion engines and, more particularly, to the charge forming means therefor.

In the operation of a multicylinder internal combustion engine of the so-called spark ignited type, in order to obtain the maximum efficiency and power therefrom, it is essential that each of the cylinders receives charges of substantially identical proportions and of maximum volume. One means of accomplishing this objective is to provide an intake manifold having a plurality of induction passages communicating with the cylinders and injecting the fuel into the air as it flows through these passages. If these passages are properly shaped, they will act as ram pipes, i.e., they will create a ram effect in the air flow that will increase the charge of air inducted into the cylinders. In order to retain control over the volume of air flow, it is necessary to throttle the air. Although a separate throttle valve may be provided for each ram pipe, it has been found more satisfactory to have the ram pipes draw the air from a common plenum chamber with a throttled inlet. However, since some of the cylinders in the engine have intake strokes which overlap the intake strokes of other cylinders, if all the cylinders are drawing from a common plenum chamber, the charging of one cylinder will interfere with the charging of another cylinder, thereby decreasing the volumetric efficiency and preventing a uniform charging.

It is now proposed to provide an induction system having ram pipes arranged in groups with the cylinders in a common group having the least amount of overlapping of the intake strokes. In addition, although the ram pipes are arranged in groups, the flow resistances of each pipe will be substantially identical.

Although the intake manifold may be employed on an engine of any suitable type, in this instance it is especially adapted for use on a so-called V-type engine having angularly disposed banks of aligned cylinders. The manifold includes a pair of laterally spaced chambers that are interconnected with each other by a transverse header passage having a throttled inlet in the center thereof. The ram pipes are arranged in separate groups with the pipes in one group having the inlet ends communicating with one of these chambers and the outlet ends communicating with a group of cylinders having a minimum overlap of their intake strokes. The ram pipes in the other group are similar in that they interconnect the other chamber with another group of cylinders having a minimum overlapping of their intake strokes. In addition, the chambers are arranged on the opposite sides of the manifold so that all of the ram pipes may be arranged to have substantially identical flow resistances.

In the two sheets of drawings:

Figure 1 is a fragmentary end view, with portions thereof broken away, of an internal combustion engine employing an induction system embodying the present invention.

Figure 2 is a fragmentary plan view of said engine with portions of the intake manifold being broken away.

Referring to the drawings in more detail, the present invention may be incorporated into an induction system 10 for an intetrnal combustion engine 12 having a pair of angularly disposed banks 14, 16 of aligned cylinders separated by an upwardly opening space 20 therebetween. In the present instance each bank 14, 16 includes a pair of end cylinders 1–7 and 2–8 and a pair of center cylinders 3–5 and 4–6. The upper ends of the cylinders 1 to 8, inclusive, in each bank are enclosed by a cylinder head 22 having cavities therein that register with the ends to form combustion chambers 24. A separate intake passage 26 for each combustion chamber 24 extends transversely through the heads 22. One end of each of these passages 26 opens into a combustion chamber 24 to form a valve seat 28 for an intake valve 30 that is effective to control the admission of the charge into the cylinders. The opposite ends of the passages form intake ports 32 in the faces 34 on the inside of the cylinder heads 22.

In order to supply a combustible mixture of air and fuel for the cylinders 1 to 8, inclusive, charge forming means 36 may be disposed above the space 20 between the two banks 14, 16 of cylinders. This charge forming means 36 includes the air induction system 10 and a fuel injection system 40 responsive to the fuel demands of the engine and effective to inject the metered fuel from the nozzles 42 and into the charge in proportion thereto.

The induction system 10 for charging the cylinders 1 to 8, inclusive, includes an intake manifold 44 that is disposed over the space 20 between the two banks 14, 16 of cylinders. Although the manifold 44 may be fabricated in any suitable manner, it has been particularly arranged to be economically fabricated primarily from tubing and sheet metal parts. The present manifold 44 includes a header duct 46 which extends transversely across the top of the manifold 44. A forwardly extending inlet 48 projects from the center of the duct to draw the air from the atmosphere and supply it to the duct 46 at substantially right angles to the axis thereof. This inlet 48 may include a suitable throttle valve 50 for regulating the volume of air flow and an air flow sensing means, such as a venturi, for developing a vacuum signal for actuating the fuel injection system 40.

The oposite ends of the header duct 46 open into chambers 52, 54 disposed on the opposite sides of the manifold 44. Each of these chambers 52, 54 is formed by a flat plate 56 on the end of the duct 46 and a dished cover 58 which is secured to the plate 56. The induction passages are formed by ram pipes 61, 62, 63, 64, 65, 66, 67 and 68 that extend transversely of the manifold with the upper ends thereof forming openings 71, 72, 73, 74, 75, 76, 77 and 78 in the plates 56 symmetrically disposed about the ends of the header duct 46. The lower ends of the ram pipes 61 to 68, inclusive, form openings 81, 82, 83, 84, 85, 86, 87 and 88 in the elongated base plates 89. These base plates 89 are secured to the faces 34 and include openings 81 82, 83, 84, 85, 86, 87 and 88 spaced to register with the intake ports 32 in the faces 34.

It will thus be seen that the ram pipes 61 to 68, inclusive, are divided into two groups 100, 102. The pipes 61, 64, 66 and 67 in one group 100 interconnect the chamber 54 on one with one group of cylinders 1, 4, 6 and 7, while the pipes 62, 63, 65, and 68 in the other group 102 interconnect the other chamber 52 with another group of cylinders 2, 3, 5 and 8. By a careful selection of the cylinders that comprise each group, there will be a minimum amount of overlapping of the charging cycle or the intake strokes of the cylinders charged through a common chamber 52 or 54. For example, if the engine has a firing order of 1, 8, 4, 3, 6, 5, 7, 2, by connecting the ram pipes for each chamber with a pair of center cylinders and a pair of end cylinders, the cylinders charged by chamber 54 will include 1, 4, 6, 7, and those charged by chamber 52 will include 8, 3, 5, 2. It will be noted that the intake stroke for each of the cylinders in each group 100, 102 is equally spaced by 180°. As a result, the pulses of air flow in each chamber will all be equally spaced and a minimum amount of interference between the charging of the cylinders will be present.

Although the ram pipes may be arranged in any desired manner, in the present instance they interconnect the chamber on one side with the pair of center cylinders on the opposite side and the end cylinders on the same side. These pipes should all be substantially the same length and have a large radius for any bends. Thus, the flow resistance of all induction passages will be the same and a ram effect can be induced therein.

It has been found that the volume of air posterior to the throttle valve, i.e., the volume of the header passage and end chambers, should be maintained as small as possible so as to insure a rapid response to the throttling action. If the volume is excessive, opening or closing of the throttle valve will not produce an accurate and immediate effect on the engine speed during the transient condition when the amount of air is adjusting to the new value. On the other hand, the volume of the chamber should be large enough so that the erratic flow in the ram pipes will not produce an erratic flow in the chambers.

It is to be understood that, although the invention has been described with specific reference to a particular embodiment thereof, it is not to be so limited since changes and alterations therein may be made which are within the full intended scope of this invention as defined by the appended claims.

We claim:

1. An intake manifold for an internal combustion engine having a pair of angularly disposed banks of cylinders with an upwardly opening space therebetween, said manifold comprising a pair of spaced plenum chambers disposed on the opposite sides of said manifold to be positioned over said banks, a transversely extending duct interconnecting said chambers with each other and having an inlet in the middle thereof for supplying induction air thereto, a separate set of ram pipes for each of said plenum chambers, each of said sets including substantially straight ram pipes for interconnecting its associated plenum chamber with a group of cylinders in the bank most remote therefrom and arcuate ram pipes for interconnecting said chamber with a group of cylinders in the bank closest thereto.

2. An intake manifold for an internal combustion engine having a pair of angularly disposed banks of cylinders with each bank including a pair of center cylinders and a pair of end cylinders, said manifold comprising a pair of spaced plenum chambers disposed on the opposite sides of said manifold to be positioned over said banks, a transversely extending duct interconnecting said chambers with each other and having an inlet in the middle thereof for supplying induction air thereto, a separate set of ram pipes for each of said plenum chambers, each of said sets including a pair of substantially straight ram pipes for interconnecting its associated plenum chamber with the center cylinders in the bank most remote therefrom and a pair of arcuate ram pipes for interconnecting said chamber with the end cylinders in the bank closest thereto.

References Cited in the file of this patent

UNITED STATES PATENTS

| | | |
|---|---|---|
| 1,916,500 | Summers | July 4, 1933 |
| 1,977,200 | Osterberg | Oct. 16, 1934 |
| 2,034,144 | Lauret | Mar. 17, 1936 |
| 2,046,797 | Swan | July 7, 1936 |
| 2,098,424 | Kolimbat | Nov. 9, 1937 |
| 2,119,707 | Funderburk | June 7, 1938 |
| 2,119,879 | Hoffman et al. | June 7, 1938 |
| 2,382,244 | Lundquist et al. | Aug. 14, 1945 |
| 2,766,743 | Platner et al. | Oct. 16, 1956 |
| 2,791,205 | Platner et al. | May 7, 1957 |

FOREIGN PATENTS

| | | |
|---|---|---|
| 534,458 | Germany | Sept. 28, 1931 |